United States Patent [19]

Schneider

[11] 4,272,843
[45] Jun. 9, 1981

[54] SYSTEM FOR TRANSMITTING SERVICE COMMUNICATIONS

[75] Inventor: Wolfgang Schneider, Backnang, Fed. Rep. of Germany

[73] Assignee: Licentia Patent-Verwaltungs-G.m.b.H, Frankfurt am Main, Fed. Rep. of Germany

[21] Appl. No.: 915,227

[22] Filed: Jun. 13, 1978

[51] Int. Cl.³ .............................................. H04J 1/14
[52] U.S. Cl. .................................. 370/24; 179/2 DP; 370/110; 375/7
[58] Field of Search ............. 179/2 DP, 2.5 A, 170 R, 179/170 NC, 170 T, 84 R, 84 VF, 15 BD, 15 BY; 178/58 R, 59, 60; 370/24, 27, 32, 110, 85; 375/5, 7, 8

[56] References Cited

U.S. PATENT DOCUMENTS

| | | | |
|---|---|---|---|
| 2,945,920 | 7/1960 | Vlasak | 179/170 NC |
| 3,103,558 | 9/1963 | Ligotky | 179/84 VF |
| 3,304,364 | 9/1967 | Brightman et al. | 179/2 DP |
| 3,436,487 | 4/1969 | Blane | 179/84 VF |
| 3,909,559 | 9/1975 | Taylor | 179/170 NC |
| 3,955,051 | 5/1976 | Bitzer et al. | 370/28 |
| 4,149,030 | 4/1979 | Foreman | 179/2 DP |
| 4,162,371 | 7/1979 | Belforte | 370/27 |

FOREIGN PATENT DOCUMENTS 2533711 12/1976 Fed. Rep. of Germany.

Primary Examiner—Benedict V. Safourek
Attorney, Agent, or Firm—Spencer & Kaye

[57] ABSTRACT

A radio system composed of a transmitter and an associated receiver in combination with a data transmission device and an associated voice instrument. Service channel signals operating at a frequency at the lower end of the system base band are conducted by a service channel apparatus composed of separate service channel networks for the transmitter and data transmission device connected to the service channel connections thereof. The service channel networks are connected to a common bus bar.

4 Claims, 4 Drawing Figures

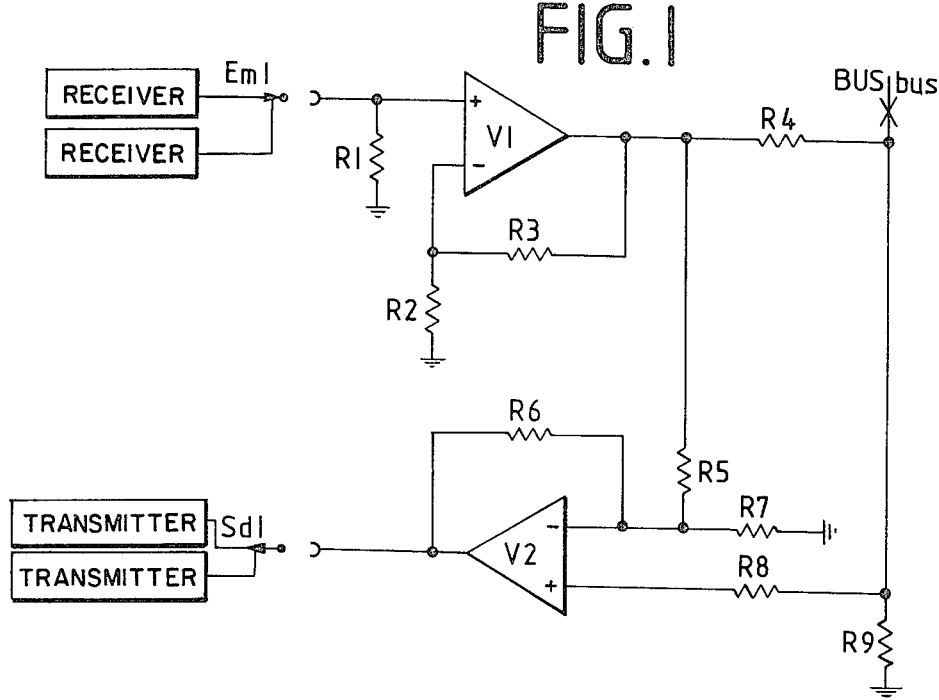
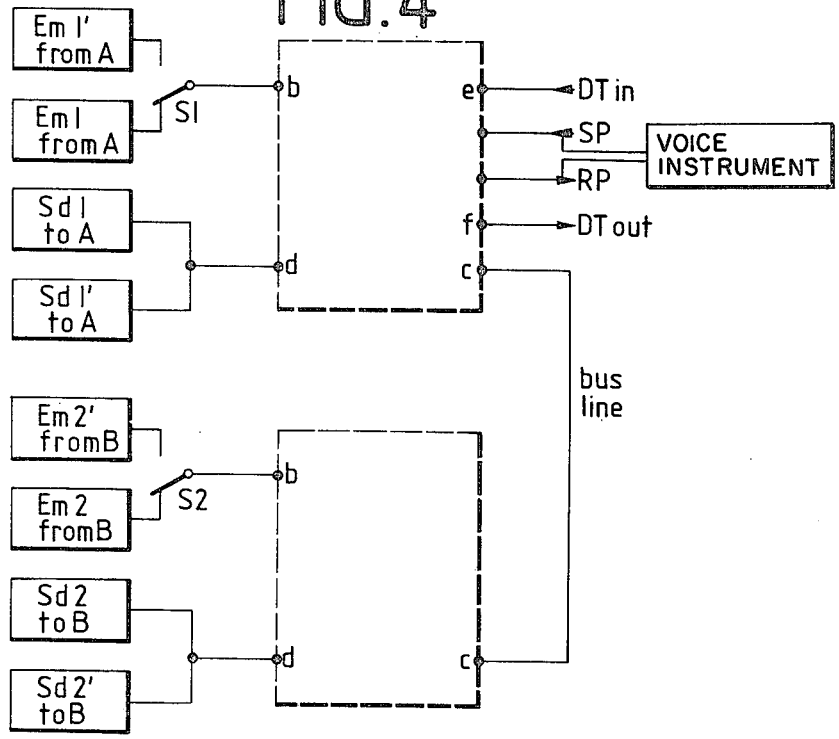

SYSTEM FOR TRANSMITTING SERVICE COMMUNICATIONS

BACKGROUND OF THE INVENTION

The present invention relates to apparatus forming a service channel in a radio system in which the service channel carrier lies at the lower frequency end of the radio system base band.

Service channel systems are aids in communication which extend parallel to the main radio transmission path. They permit service conversations for maintaining operation between radio stations and their relay stations. In order to make communications over the service channel as secure as possible, it is known to exclude all operating devices from the transmission and to modulate the service channel signal directly onto the emitted radio signal. Such a process is very complicated since extensive additional devices are required and mainly also because this service channel is intended to be used not only for telephone conversations but also for the transmission of indication signals regarding operating states, switching signals to standby devices, and measured value signals as well.

SUMMARY OF THE INVENTION

It is an object of the present invention to simplify such a system and to reduce the costs required for it.

This and other objects are accomplished according to the present invention by connecting the terminals of the service channels of a transmitter with an associated receiver and a data transmission device with an associated voice instrument, each via a separate network to a bus bar. Each network includes two coupled operational amplifiers connected so that one service channel signal is delivered to the direct input of the first operational amplifier, the first amplifier output being connected 1. to the bus bar via a resistor;
2. to the negating input of the second operational amplifier via a first voltage divider; and
3. to its own negating input via a second voltage divider to provide negative feedback. The direct input of the second operational amplifier is connected, via a further resistor, with the bus bar. In the network associated with the transmitter and receiver, the direct input of the first amplifier receives the service channel signal appearing in the receiver and the output of the second amplifier is connected to the transmitter.

To complete the system, the data transmission device with an associated voice instrument has a similar network whose first amplifier has its direct input connected to receive signals from the data transmission device and the transmitter part of the voice instrument, and whose second amplifier has its output connected to the input of the data transmission device and the receiving part of the voice instrument, each via a further resistor. Filters are connected ahead of the receiver and the transmitter of the voice instrument. The invention can be modified by connection of further transmitters with associated receivers connected to the bus bar.

Due to the grouped connection of the service line channels to a bus bar, this service line system is much simplified and is expandable. The use of operational amplifiers completely prevents transmission of an incoming conversation to the associated transmitter. This is accomplished by a feedback connection of the incoming conversation at the negating input of the operational amplifier which is connected ahead of the transmitter.

BRIEF DESCRIPTION OF THE DRAWINGS

FIG. 1 is a diagram of an embodiment of a circuit arrangement according to the invention for a transmitter with an associated receiver.

FIG. 4 is a diagram similar to that of FIG. 3 of a combination at a relay station with substitute instruments.

DESCRIPTION OF THE PREFERRED EMBODIMENTS

In the circuit shown in FIG. 1, the incoming service channel from a receiver Em1 is connected to the direct input terminal of a first operational amplifier V1. An input resistor R1 is connected between that input and ground. The output of the operational amplifier V1 is connected via a resistor R4 to a BUS line. The output of amplifier V1 is also connected via a first voltage divider R5/R7 to the negating input of the second operational amplifier V2, and via a second voltage divider R2/R3 to its own negating input.

The input to a transmitter Sd1 is connected to the output of a second operational amplifier V2. The direct input of amplifier V2 is connected to the BUS line via a resistor R8. The BUS line is terminated by a resistor R9. The value of resistor R9 is dependent on the number of identical networks, n, connected to the BUS line and is calculated as follows: $R9 = (R4/n - 1)$. The input resistance of amplifier V2 can be neglected because it is much greater than R9.

A conversation signal coming from receiver Em1 reaches transmitter Sd1 via the first operational amplifier V1, a resistor R5 and the second operational amplifier V2. This signal is delivered to the negating input of amplifier V2 to which feedback resistor R6 is connected. The voltage divider R5/R7 couples this signal from receiver Em1 to the negating input of the second operational amplifier V2.

The signal from the output of amplifier V1 is also conducted via resistor R4, the BUS line and resistor R8 to the direct input of amplifier V2 and the signals from amplifier V1 reaching the inputs of amplifier V2 cancel one another out and become zero so that the transmitter Sd1 is not provided with any signal component of the signal from receiver Em1.

The voltage divider R2/R3 between the output and the negating input of the first operational amplifier V1 and the resistor R6 between the output and the negating input of the second operational amplifier V2 constitute feedback connections which serve to regulate the total gain of the individual amplifiers and to stabilize the degree of amplification.

Figure 2:
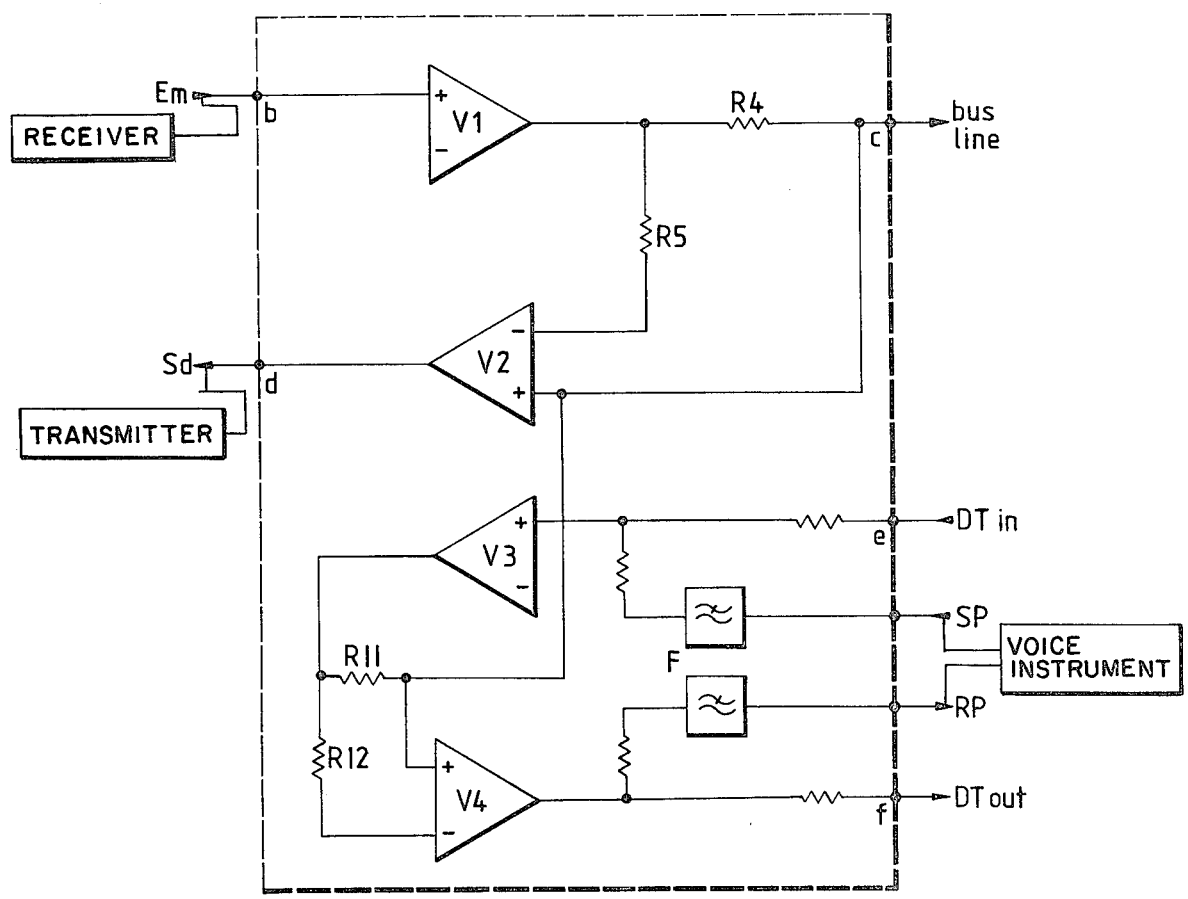
FIG. 2 is a diagram similar to that of FIG. 1 showing two networks connected together via a bus line for a receiver with an associated transmitter and data transmission device with an associated voice instrument.

FIG. 2 shows a circuit arrangement providing the elements for the service channel for a receiver/transmitter at the same location and for a data transmission device with a voice instrument remote from this location and connected together via a BUS line. The arrangement is a receiver module in which the signal arriving at receiver Em is fed to the direct input of operational amplifier V1 via a terminal b of a plug-in strip. Amplifiers V1 and V2 correspond to those of FIG. 1, but the details of the circuit elements shown in FIG. 1 are not shown here but are present in an actual circuit. The operational amplifier V2 has its output connected to terminal d and is connected with the transmitter Sd. The BUS line for the entire system is connected to terminal c.

The BUS line is further connected to operational amplifiers V3 and V4 associated with the remote transmission device and voice instrument. The incoming line $DT_{in}$ from the data transmission device is connected via terminal e to the direct input of the operational amplifier V3, to which is also connected the transmitter part SP of the voice instrument, both lines being decoupled by resistors.

The output of the fourth operational amplifier V4 leads to the data transmission device output line $DT_{out}$, at terminal f, and to the receiving part RP of the voice instrument. Both of those lines are likewise decoupled by resistors.

Connections to parts SP and RP are effectuated via low-pass filters F. The filters F limit the speech band at 2.4 kc/s so that the band is free for transmission of control signals above this frequency.

The feedback connections of FIG. 1, which are not shown in detail in FIG. 2 are also provided for the circuit unit of amplifiers V3 and V4 and prevent the incoming conversations from receiver Em from returning via the associated transmitter Sd. This applies as well for the transmitter and receiver parts of the voice instrument and for the data transmission device at terminals DT.

Figure 3:
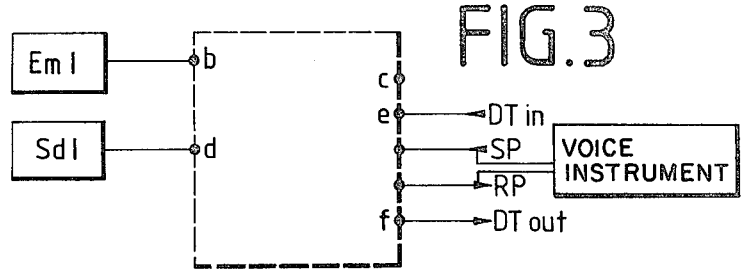
FIG. 3 is a block diagram of a circuit for a combination utilizing a simple end position.

FIG. 3 shows an embodiment of a circuit provided for a simple end position. A simple end position is connected to the end of a radio system, and this simple end position receives from one direction and transmits in one direction unlike the relay station of FIG. 4. which receives from many directions and transmits to many directions.

The circuit in the brokenline box corresponds in its details to the box labeled arrangement of FIG. 2. The circuit Em1 contains the receiver connected at terminal b and the box labeled Sd1 contains a transmitter Sd1 connected to its service line at terminal d.

FIG. 4 shows a circuit combination of instruments in a relay station. Here the active instruments are shown schematically in the drawing as Em1, Em2, Sd1 and Sd2. Receiver Em1 and transmitter Sd1, which correspond to those of FIG. 2, receive and send in the opposite directions from receiver Em2 and transmitter Sd2. Also shown are standby instruments, i.e. a receiver Em1', transmitter Sd1', receiver Em2' and transmitter Sd2'.

The switches S1 and S2 inserted in the interconnection are electronically controllable and switch the system to the standby instruments when there is a malfunction in the active devices.

The relay station of FIG. 4 permits reception of a signal from two directions "A" and "B" and transmission of a signal in the same two directions.

The notation of the terminals for connection are the same as in FIG. 2.

It will be understood that the above description of the present invention is susceptible to various modifications, changes and adaptations, and the same are intended to be comprehended within the meaning and range of equivalents of the appended claims.

What is claimed is:

1. In combination with a service channel for a radio system wherein signals are sent over said service channel at the lower end of the system base band, said radio system including a transmitter and a receiver associated with said transmitter, and a data transmission device and a voice instrument associated with said data transmission device, apparatus comprising:

a common bus bar;
  a first network coupling said transmitter and receiver to said bus bar, said first network including a first operational amplifier having its direct input connected to receive service channels signals from said receiver; a second operational amplifier having its output connected to deliver service channel signals to said transmitter; a first receiver connecting the output of said first amplifier to said bus bar; a first voltage divider connecting the output of said first amplifier to the negating input of said second amplifier; a second voltage divider connecting the output of said first amplifier to the negating input thereof; and a second resistor connecting the direct input of said second amplifier to said bus bar, whereby the output of said first amplifier is connected to the direct input of said second amplifier via said first resistor, said bus bar and said second resistor; and
  a second network coupling said data transmission device and said voice instrument to said bus bar.

2. In combination with a service channel for a radio system wherein signals are sent over said service channel at the lower end of the system base band, said radio system including a transmitter and a receiver associated with said transmitter, and a data transmission device and a voice instrument associated with said data transmission device, apparatus comprising:

a common bus bar;
  a first network coupling said transmitter and receiver to said bus bar, said first network including a first operational amplifier having its direct input connected to receive service channel signals from said receiver, a second operational amplifier having its output connected to deliver service channel signals to said transmitter, a first resistor connecting the output of said first amplifier to said bus bar, a first voltage divider connecting the output of said first amplifier to the negating input of said second amplifier, a second voltage divider connecting the output of said first amplifier to the negating input thereof, and a second resistor connecting the direct input of said second amplifier to said bus bar, whereby the output of said first amplifier is connected to the direct input of said second amplifier via said first resistor, said bus bar and said second resistor; and
  a second network coupling said data transmission device and said voice instrument to said bus bar, said second network including third and fourth operational amplifiers, said third amplifier having its direct input connected to receive service channel signals from said data transmission device and the transmitter part of said voice instrument and said fourth amplifier having its direct input coupled to said bus bar, and third and fourth resistors connecting the output of said third amplifier to said bus bar and to the negating input of said fourth amplifier respectively, the output of said fourth amplifier transmitting data and voice service channel signals.

3. Apparatus as defined in claim 2 which further comprises a first filter connected in the signal path from the transmitter part of the voice instrument to the direct input of said third amplifier and a second filter in the signal path from the output of said fourth amplifier to the receiver part of the voice instrument.

4. An arrangement as defined in claim 1, 2 or 3 wherein further transmitters with associated receivers are connected to the bus bar.

* * * * *